June 28, 1955     M. C. DENISON ET AL     2,711,686
DEWATERING AQUEOUS LEAD SLUDGES Filed June 21, 1951     2 Sheets-Sheet 1

INVENTORS
MORTIMER C. DENISON
and NELSON WHITMAN
BY
ATTORNEY.

June 28, 1955 M. C. DENISON ET AL 2,711,686
DEWATERING AQUEOUS LEAD SLUDGES
Filed June 21, 1951 2 Sheets-Sheet 2
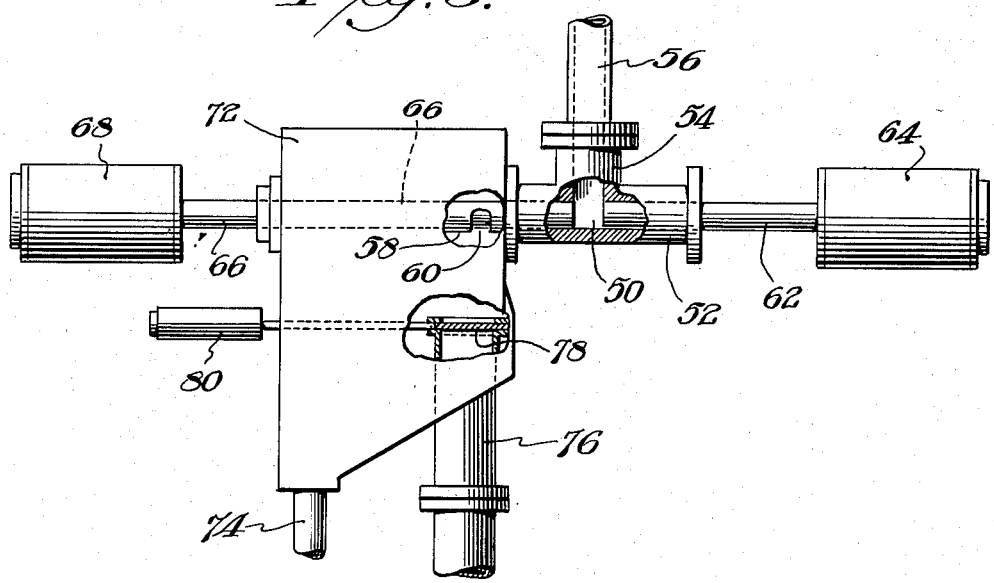
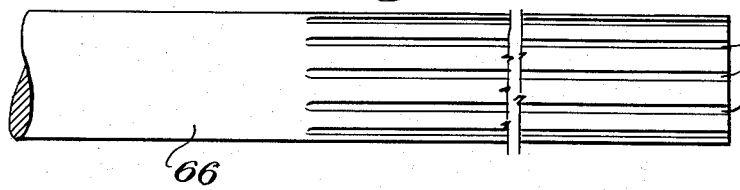
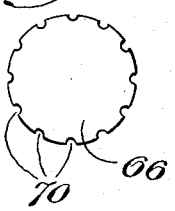
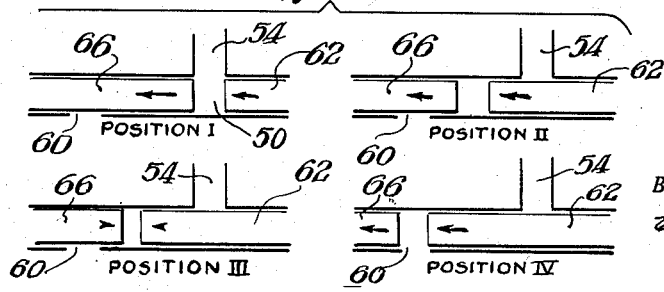
INVENTORS
MORTIMER C. DENISON
and NELSON WHITMAN
BY
Edwin C. Woodhouse
ATTORNEY.

2,711,686

DEWATERING AQUEOUS LEAD SLUDGES

Mortimer C. Denison, Marshallton, and Nelson Whitman, Wilmington, Del., assignors to E. I. du Pont de Nemours & Company, Wilmington, Del., a corporation of Delaware Application June 21, 1951, Serial No. 232,852

5 Claims. (Cl. 100—37)

This invention relates to a process for dewatering aqueous lead sludges, particularly sludges such as are formed in the manufacture of tetraethyl lead.

Tetraethyl lead is manufactured by the reaction of an excess of ethyl chloride with an alloy of lead and sodium. After the reaction is completed, the excess ethyl chloride is distilled off from the reaction mass, the reaction mass is drowned in water and the tetraethyl lead is removed therefrom by steam distillation. During such process, the sodium of the alloy is mostly converted to sodium chloride, about 25% of the lead in the alloy is converted to tetraethyl lead, and the remainder of the lead is converted to metallic lead in finely divided form suspended in the dilute solution of sodium chloride. Such suspension is then conveyed to a sludge pit where it is allowed to settle to form an upper layer of the aqueous solution of salt and a lower layer of aqueous sludge which comprises the lead mixed with from about 8% to about 20% by weight of the aqueous solution of the salt. The water layer is drawn off and the aqueous sludge is washed with water to remove most of the salt, then dried to remove most of the water, and the resulting lead is refined by melting in a reverberatory furnace at about 700° C. to about 900° C. This process of handling the lead sludge is expensive and hazardous throughout, because of the presence of residual tetraethyl lead therein. It requires extensive facilities in the form of sludge pits, driers, furnaces and equipment for handling the sludge, and large amounts of heat. Recently, there has been developed a continuous process for carrying out the reaction and manufacturing tetraethyl lead, which further complicates the handling of the sludge and the recovery of the lead therefrom.

It is an object of the present invention to provide an improved and simplified method for dewatering and desalting aqueous lead sludges, which facilitates the recovery of the lead therefrom. Another object is to provide a method of such character which is particularly adapted for the treatment of aqueous lead sludges that are formed in the manufacture of tetraethyl lead. A further object is to provide such a process which is particularly adapted to be operated as a part of an integrated process in which all steps in the manufacture of tetraethyl lead and the recovery of the by-products are operated continuously. Other objects are to advance the art. Still other objects will appear hereinafter.

The above and other objects may be accomplished in accordance with our invention which comprises introducing between opposing solid pressure members an aqueous lead sludge, comprising essentially of a mixture of lead and from about 3% to about 20% by weight of water in which the lead is in the form of small discrete pieces and particles, and compressing the sludge between such members under a pressure of from about 1000 to about 20,000 pounds per square inch and removing the water from the sludge during such compression.

While such aqueous sludges are, in general, sufficiently fluid to flow through wide pipes and funnels by gravity alone and to flow under slight pressures into the compression chamber of a press, particularly when the lead is in finely divided form and the mixtures contain 8% or more of water, they are not forced out from between the pressure members during compression, but the lead is substantially completely retained between the pressure members under the high pressures employed. In other words, while the passages provided for the flow of water from between the pressure members are considerably larger than the lead particles in the sludge, little or none of the lead particles will flow out through such passages with the water. Thereby, substantially all of the lead particles are subjected to the pressure of the pressure members and compressed into compacted form as sheets, strips, flakes or pellets, and the major proportion of the liquid is squeezed out of the sludge.

The resulting compacted lead product is of a character which is particularly suitable for refining to recover pure lead therefrom. In the refining process, it will usually be crushed and then melted and the molten lead separated from the infusible material.

The process of our invention is applicable to the treatment of the sludges obtained in the manufacture of tetraethyl lead by the well known batch process and, particularly, to those sludges from which all or most of the tetraethyl lead has been removed by steam distillation. Our process is particularly adapted to the treatment of the sludges that are obtained in the continuous process for making tetraethyl lead. It is also useful in treating sludges produced by other methods.

The sludges which are to be treated in accordance with our invention comprise essentially mixtures of lead with from about 3% to about 20% by weight of water and, preferably, from about 8% to about 20% of water. The sludge may contain all or part of the tetraethyl lead that is present in the original reaction mixture. Such tetraethyl lead will be largely expelled from the lead with the water during the compression, but to a varying extent and usually incompletely. Since the presence of tetraethyl lead in the compacted lead presents a serious hazard in the subsequent refining of the lead and complicates such refining, the tetraethyl lead will usually be removed from the sludge as completely as is practical prior to the treatment of the sludge by our process. The sludge may also contain all of the sodium chloride that is present in the original reaction mixture or in the settled sludge, and such salt will be largely expelled as a solution in the water during the compression. However, a small amount of the salt will remain in the compacted lead with the unexpelled water. The presence of such salt in the compacted lead also somewhat complicates the subsequent refining of the lead. Accordingly, it is preferred to wash out most of the salt from the sludge prior to treating it by the process of our invention, as by diluting the original sludge with water, allowing the solids to settle and then decanting or otherwise separating the aqueous layer containing the sodium chloride. Unless the washing is very thorough, the sludge will still usually contain from about 2% to about 10% by weight of sodium chloride dissolved in the water in the sludge.

Generally, the lead in the sludge will be in the form of small discrete pieces and particles, i. e. not materially larger than about 1 inch in diameter. The maximum permissible size of the pieces of lead will be limited by the size and capacity of the equipment in which the sludge is to be handled and compressed. As originally produced in the manufacture of tetraethyl lead, the lead in the sludge is in a finely-divided form, the particles of lead having an average diameter of less than 0.1 inch. Ordinarily, the majority, roughly about 75%, of the particles have diameters in the range of about 0.003 to about 0.08 inch, although some may be as small as about 10 microns (0.0004 inch). However, during the handling of the sludge, and particularly during steam distillation and washing, a small proportion of the lead will frequently become agglomerated into larger pieces, up to about 1 inch in diameter and sometimes much larger. These larger pieces of lead do no harm, unless the passages, in the equipment through which the sludge is to be passed, are so small that such pieces will clog such passages. In such case, the larger pieces can be screened out and compressed in a larger press or crushed to a smaller size for pressing or refining. Accordingly, our process will usually be employed with sludge, of the character of that normally produced in the manufacture of tetraethyl lead, in which the lead is in the form of particles having an average diameter of less than 0.1 inch and which is free of pieces of lead having a diameter larger than about 1 inch, and most usually sludge in which the lead particles have diameters largely or entirely within the range of about 0.003 inch to about 0.08 inch.

The size of the charge of sludge, that is to be compressed, is determined by the size and capacity of the press. Preferably, the charge will not be materially greater than about 1 cubic foot and will not have a depth (distance between the pressure members) much greater than about 1 foot. Charges of greatly increased size require larger, more bulky and more expensive equipment which will usually be inefficient and render the process uneconomical.

During the handling of the lead sludge prior to treatment by the process of our invention and, particularly, during the distillation and washing procedures, the surfaces of the lead particles usually become oxidized. In some cases, the amount of such lead oxide will be less than 1% by weight of the lead and, in severe cases, may be as much as 20% to 30%, but usually will constitute from about 2% to about 10% by weight, covering the surfaces of the pieces and particles of lead. Accordingly, the percentages of lead in the sludge, as specified herein, include that present as lead oxide, as well as the unoxidized lead. While the presence of such lead oxide does not affect the process of this invention, it is objectionable in the subsequent refining of the lead. Accordingly, it is desirable to maintain the surfaces of the lead sludge covered with a layer of added water before compression, so as to minimize atmospheric oxidation of the lead. Also, such layer of water will prevent the portions of the sludge near the surface from drying out. When portions of the sludge are permitted to dry out, they tend to cake and become lumpy and, if such drying out is permitted to proceed to a material extent, the sludge may become so lumpy as to render the feed thereof to the presses difficult or impossible.

The process of our invention requires high pressures of about 1000 p. s. i. or more. Pressures as low as 1000 p. s. i. have been used. It will usually be desirable to employ pressures of from about 1900 p. s. i. to about 20,000 p. s. i. and, preferably, from about 1900 p. s. i. to about 10,000 p. s. i. The time required to obtain maximum compression, and the amount of water retained in the sludge, will decrease with increase in the pressure. Increase in pressure, above 10,000 p. s. i., has little effect to further reduce the water content of the lead and hence will not ordinarily be justified from an economic standpoint. Pressures materially above 20,000 p. s. i. may be used, but they usually require large and uneconomically heavy apparatus so that they ordinarily will not be desired. Usually, it will be most convenient to compress the sludge at atmospheric temperatures, although any temperatures above the freezing point of the aqueous phase of the sludge are operable.

The process of our invention may be carried out in a wide range of equipment, as by feeding the aqueous sludge (a) into the nip of a pair of oppositely rotated rolls which will compact the lead particles into strips, sheets or flakes and expel the water as the material is drawn between the rolls; or (b) into a chamber or confined space, such as a die or cylinder, wherein it is subjected to pressure from reciprocating rams or plungers to expel the water and compact the lead into pellets or blocks; or (c) by pressing the sludge between horizontal plates.

Representative types of apparatus for carrying out the process of our invention are shown in the accompanying drawings in which:

Figure 3 is a front view of a third and preferred type of apparatus, with parts broken away for clearness of illustration;

Figure 4 is an enlarged side view of a ram of the apparatus of Figure 3;

Figure 5 is an end view of the ram of Figure 4; and

Figure 6 is a diagrammatic illustration of the different positions of the rams in the operation of the apparatus of Figure 3.

Figure 1:
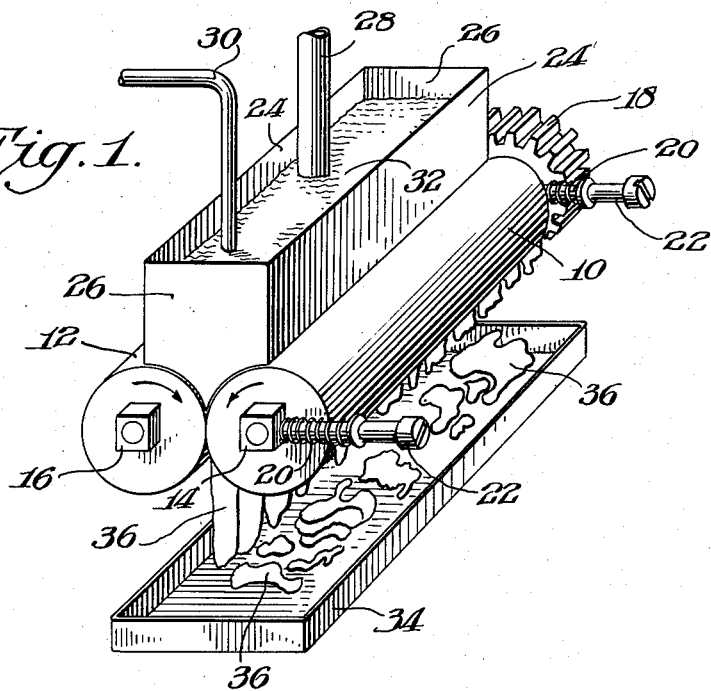
Figure 1 is a perspective view of one type of apparatus, with parts omitted for clearness of illustration.

Referring to Figure 1, smooth steel rolls 10 and 12 are mounted in journal bearings 14 and 16 at each end and are rotated in opposite angular directions, as shown by the arrows on the ends thereof, by gearing 18. The journal bearings 14 are forced toward journal bearings 16 by heavy springs 20 on adjusting screws 22, so as to force the rolls 10 and 12 into close contact under pressures controlled by adjustment of the tension of the springs. As so far described, the apparatus is similar to roll mills for milling rubber and other materials, and it will be understood that the journals 14 and 16 and adjusting screws 22 will be mounted and supported in a suitable frame in conventional manner. Since such frame and the methods and means for supporting the operating parts therein are conventional and well known to the art, such structure has been omitted so as to enable the essential operating parts to be more clearly shown.

A feed box is mounted over the rolls and consists of side walls 24 and end walls 26. The side walls 24 extend for substantially the length of the rolls and fit closely on top thereof, preferably, in the vertical planes of the axes of the rolls. The side walls may be shorter and may be set closer together, but may not extend beyond the ends of the rolls. The lower portions of the end walls extend down between the rolls, substantially to the point of contact of the rolls with each other, and have their bottom edges formed to closely fit against the upper inner quadrants of the rolls. Thus, the rolls form the bottom of the feed box.

A pipe 28 is provided for feeding wet sludge to the feed box. A pipe 30 has an end immersed in the water layer 32 in the feed box and is connected to a vacuum receiver, not shown. A pan or tank 34 is positioned below the mill to receive the compacted lead 36 and a minor proportion of the water.

In operation, the rolls are rotated and wet sludge is continuously fed into the feed box through pipe 28. The sludge enters the nip of the rolls which compacts the lead particles into discontinuous sheets, strips or flakes 36, and expels the water therefrom. Most of the water, squeezed out of the sludge, is retained in the feed box and forms a layer 32, substantially free of lead, on top of the sludge. Such layer of expelled water is continuously drawn off through the vacuum line 30. The compacted lead flakes 36, formed and fed by the rolls, drop into the pan 34, together with a minor proportion of the expelled water which can be readily decanted and evaporated from the compacted lead flakes. By this apparatus, the water in the lead can be readily reduced to about 2% to about 5% by weight, depending upon the pressure of contact between the rolls. If it is desired to further reduce the amount of water in the compacted lead flakes, they can be again passed through rolls or pressed in another different type of press.

Figure 2:
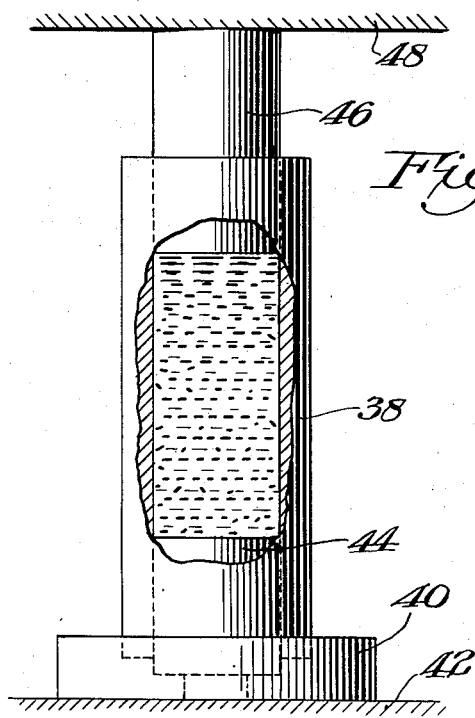
Figure 2 is a side view of a second type of apparatus, with parts broken away for clearness of illustration.

Referring to Figure 2, a cylindrical die 38, having an internal diameter of about 1.125 inches and a height of about 4 inches, is supported on a ring 40 mounted upon a lower press platen 42. A bottom plunger 44, also supported by the ring 40, fits loosely in the lower end of the die. A top plunger 46 is mounted on the lower surface of an upper press platen 48, and has an external diameter of about 0.004 inch to about 0.006 inch less than the internal diameter of the die and fits loosely into the upper end of the die. It will be understood that the size of the die may be widely varied, with corresponding variations in the sizes of the cooperating parts.

In operation, the die, bottom plunger and supporting ring are placed in position as shown in Figure 2, with the top plunger raised above the die. A charge of wet lead sludge is placed in the die to partially fill it, usually to a height of about 1 to about 1.5 inches. The press platens are moved toward each other to introduce the top plunger into the top of the die, into contact with the sludge, and then to compress the sludge under the desired pressure. During such compression, the water is squeezed out of the lead and escapes between the top plunger and the die, and the lead is compressed to a dense, compact pellet of about ½ the height of the original charge. After the pellet has been formed, the press platens are moved to their original positions, the die is removed from the press and the lead pellet is dropped (or pushed) out of the die. By such operation, the water content of the lead can be readily reduced to 1% to 4% by weight or less, depending upon the pressure employed.

Referring to Figures 3 to 6, inclusive, which represents the preferred embodiment of our invention, the apparatus comprises a press having an elongated cylindrical chamber and two opposed rams operating therein to rapidly form compacted lead pellets. The cylindrical chamber 50 is formed, in part, by the bore of the horizontal cross portion 52 of an inverted T-shaped member. The vertical portion 54 is connected to a feed pipe 56 for the wet sludge. The bore of the portion 54 and of the feed pipe 56 may be smaller or larger than the bore of portion 52, but, preferably, will be of substantially the same diameter. The cylindrical chamber 50 is extended to the left by a pipe 58 having an internal diameter equal to the diameter of the bore in portion 52. Such pipe 58 is provided with a port 60 somewhat larger than the pellets to be produced. Also, such port 60 is spaced from the sludge inlet to the chamber 50 by a distance somewhat greater than the length of the charge of wet sludge.

A ram 62 has a sliding fit in the right-hand portion of the cylindrical chamber 50 and is reciprocated in such chamber through a hydraulic (or pneumatic) cylinder 64. An opposing ram 66 has a sliding fit in the pipe 58 and in the left-hand portion of the cylindrical chamber 50 and is reciprocated therein through a hydraulic (or pneumatic) cylinder 68. The ram 66 is provided with a plurality of small longitudinal grooves 70 in its cylindrical surface, which grooves extend from the end of the ram backwardly for a distance equal to at least ½ the distance between the port 60 and the sludge inlet to the chamber 50 and, preferably, slightly greater than the distance between the port and the sludge inlet. The number, size and form of the grooves 70 may be widely varied, provided that they do not greatly reduce the area of the end of the ram. Similar grooves may be provided on ram 62, if desired.

In the structure employed in Example 3, the feed line, the cylindrical chamber and the rams had diameters of substantially 3 inches. The ram 66 had 32 grooves 70, each of which was semi-circular, about 1/16 inch wide, about 1/32 inch deep and about 1 foot long. However, the size of the structure may be widely varied, depending upon the scale of the operations in which it is employed.

The pipe 58 is enclosed in a relatively large chamber 72, the lower end of which is in the form of a chute connected with a water discharge pipe 74. A pellet discharge chute 76 extends upward through the bottom of the chamber 72 and has its upper end positioned under port 60. A sliding cover 78 fits over the end of the chute 76 and is intermittently operated to uncover the end of the chute 76 by a cylinder rod and a hydraulic (or pneumatic) cylinder 80.

The operation of the apparatus of Figures 3 to 5 will be best understood by special reference to Figure 6 which illustrates the operation and successive positions of the rams. The rams 62 and 66 will be in position I, with their ends to each side of the sludge inlet opening of the cylindrical chamber 50, whereupon the aqueous sludge will flow by gravity into the space between the ends of the rams. The distance between the ends of the rams may be varied conveniently up to about 12 inches, so as to vary the size of the charge and of the pellets as desired, but, preferably, will be substantially equal to the diameter of the sludge inlet of the cylindrical chamber (3 inches in Example 3). The rams 66 and 62 are then moved together in the direction of the arrows to position II, which will bring the charge of aqueous sludge to a compression zone intermediate the port 60 and the sludge inlet of the chamber 50. At this point, the motion of ram 66 will be stopped or reversed as shown in position III, to compress the charge, to expel the water, and to press the particles of lead together into a dense compacted pellet. Most of the expelled water passes through the grooves 70 in ram 66, through the port 60 and into the chamber 72, but is prevented from entering chute 76 by cover 78. Little or no lead particles pass out with the expelled water, even though the grooves 70 are much larger than such particles, such particles usually having an average diameter of less than 0.1 inch with some as small or smaller than 10 microns. When the compression has been completed, the rams are moved to the left to position IV to bring the pellet over the port 60, the ram 66 moving faster and further than ram 62 so as to release the pellet and permit the pellet to drop through the port. The cover 78 is moved to uncover the chute 76 after the compression step and before the pellet reaches the port 60, whereby the pellet drops into the chute 76. Then the cover 78 is moved to close the chute 76 and the rams are returned to position I to receive a new charge of aqueous sludge, and the cycle of operation is repeated.

Such apparatus and process is controlled automatically and operates at a rapid rate so that it is particularly well adapted for commercial use in a continuous process for making tetraethyl lead and the aqueous sludge. For large scale commercial use, the apparatus will ordinarily be of larger size, for example, such that the charge of sludge in the compression chamber will be about 12 inches long and about 12 inches in diameter.

In order to further illustrate our invention, preferred modes of carrying the same into effect and the advantageous results to be obtained thereby, the following examples are given:

Example 1

Lead sludge, in which the lead particles had an average size of less than 0.1 inch and which had a moisture content of about 8.5%, was fed continuously into a mill similar to that of Figure 1 in which the rolls were 2 inches in diameter and 6 inches long and were rotated in opposite angular directions at speeds of 15 R. P. M. and 17 R. P. M., respectively. The pressure, thus exerted upon the sludge, was estimated at about 10,000 p. s. i. The lead particles of the sludge were compacted into smooth, metallic, self-sustaining flakes and strips about 0.009 to 0.015 inch thick, containing about 4% water, which were delivered from the bottom of the mill. Most of the water, squeezed out of the sludge, was retained in the feed box in the form of a top layer, largely free of sludge, and was continuously removed.

*Example 2*

Lead sludge, in which the lead particles had an average size of less than 0.1 inch and which contained about 15–20% water and about 1% sodium chloride, was confined in a die similar to that shown in Figure 2 in which the diameter of the plunger was 0.004 inch less than the diameter of the cylinder. A pressure of 1,920 p. s. i. was then applied to the plungers to compress the sludge. The liquid phase was squeezed out between the top plunger and the wall of the die. After 30 seconds under pressure, a dense, compact pellet was formed, containing 4% water and 0.15% salt. Under 4,777 p. s. i. for 5 seconds, sludge of the same composition gave compressed pellets containing 1.0% of water and 0.12% salt. The pellets were hard, compact, and more or less porous, with a specific gravity between 6.8 and 9.5.

*Example 3*

Lead sludge, in which the lead particles all had a diameter of less than 0.1 inch and which contained about 9.5% water and about 1% NaCl and was at a temperature of 20° C. to 30° C., was pressed in the apparatus of Figures 3 to 6 for 10 seconds under a pressure of 6,600 p. s. i., resulting in a pellet containing 1.0% water and having a density of 9.1 gms./cc. Similarly, lead sludge, in which the lead particles all had a diameter of less than 0.1 inch and which contained about 20.6% water and less than 0.1% NaCl and was at a temperature of 40° C. to 50° C., was pressed for 5 seconds under a pressure of 5,250 p. s. i. to give a pellet containing 1.85% water and having a density of 7.47 gms./cc. Lead sludge, containing lumps of lead of about ½ inch to about 1 inch in diameter, also has been successfully treated similarly in this apparatus.

*Example 4*

Washed sludge (170 g.), similar to that used in Example 1 and containing 8.0% water, was compressed between two horizontal flat steel plates 16 x 3 inches and 2 inches thick by tightening two bolts at the ends by means of a large wrench. Water was squeezed out, leaving a compressed cake. The center of this cake, weighing 74 g. on which the greatest pressure was applied, was hard, dense, and dry and contained only 0.39% water. Under a microscope, a fragment, obtained by breaking up the cake, was seen to be composed of compacted discrete particles, apparently corresponding to the particles of the sludge. The material at the edge of the cake, which had been pushed out from the original location of the mass of sludge and therefore had not been subjected to much pressure, contained 6.1% water.

It will be understood that the apparatus and embodiments, disclosed in the drawings and given in the examples, are included merely for purposes of illustration and that our invention is not limited to the specific apparatus and embodiments so disclosed. On the other hand, it will be readily apparent that many variations can be made in the size, character and construction of the equipment employed, and in the details and conditions of carrying out the process, without departing from the spirit or scope of our invention, as herein disclosed and as defined in the appended claims.

As disclosed, the process is adapted to simultaneously remove salt or tetraethyl lead or both from the aqueous lead sludges, if desired.

We claim:

1. The process for recovering lead in a dewatered and compacted form from an aqueous lead sludge comprising essentially a mixture of lead and from about 3% to about 20% by weight of water in which the lead is in the form of small discrete pieces and particles having an average diameter of less than 0.1 inch and having their surfaces oxidized, which process comprises introducing the sludge between opposing solid pressure members, compressing the sludge and compacting the lead between such members under a pressure of from about 1,000 to about 20,000 pounds per square inch, and removing the water from the sludge during the compression.

2. The process for recovering lead in a dewatered and compacted form from an aqueous lead sludge comprising essentially a mixture of lead and from about 3% to about 20% by weight of water in which the lead is in the form of small discrete pieces and particles having an average diameter of less than 0.1 inch and having their surfaces oxidized, which process comprises introducing the sludge between opposing solid pressure members, compressing the sludge and compacting the lead between such members under a pressure of from about 1,900 to about 10,000 pounds per square inch, and removing the water from the sludge during the compression.

3. The process for recovering lead in a dewatered and compacted form from an aqueous lead sludge comprising essentially a mixture of lead and from about 3% to about 20% by weight of a dilute aqueous solution of sodium chloride in which the lead is in the form of discrete pieces and particles having an average diameter of less than 0.1 inch and having their surfaces oxidized, which process comprises introducing the sludge between opposing solid pressure members, compressing the sludge and compacting the lead between such members under a pressure of from about 1,900 to about 10,000 pounds per square inch, and removing the aqueous solution from the sludge during the compression.

4. The process for recovering lead in a dewatered and compacted form from an aqueous lead sludge comprising essentially a mixture of lead and from about 8% to about 20% by weight of a dilute aqueous solution of sodium chloride in which the lead is in the form of small discrete pieces and particles having an average diameter of less than 0.1 inch and having their surfaces oxidized, which process comprises introducing the sludge between opposing solid pressure members, compressing the sludge and compacting the lead between such members under a pressure of from about 1,000 to about 20,000 pounds per square inch, and removing the aqueous solution from the sludge during the compression.

5. The process for recovering lead in a dewatered and compacted form from an aqueous lead sludge comprising essentially a mixture of lead and from about 8% to about 20% by weight of a dilute aqueous solution of sodium chloride in which the lead is in the form of small discrete pieces and particles having an average diameter of less than 0.1 inch and having their surfaces oxidized, which process comprises introducing the sludge between opposing solid pressure members, compressing the sludge and compacting the lead between such members under a pressure of from about 1,900 to about 10,000 pounds per square inch, and removing the aqueous solution from the sludge during the compression.

References Cited in the file of this patent

UNITED STATES PATENTS

| | | |
|---|---|---|
| 438,960 | Stewart | Oct. 21, 1890 |
| 602,866 | McKown | Apr. 26, 1898 |
| 1,149,537 | Phillips | Aug. 10, 1915 |
| 1,819,480 | Paxton | Aug. 18, 1931 |
| 1,867,137 | Carver | July 12, 1932 |
| 1,985,598 | Carver | Dec. 25, 1934 |

FOREIGN PATENTS

| | | |
|---|---|---|
| 911,244 | France | Mar. 4, 1946 |